United States Patent [19]
Richards

[11] Patent Number: 6,164,549
[45] Date of Patent: Dec. 26, 2000

[54] IC CARD WITH SHELL FEATURE

[75] Inventor: Timothy Philip Richards, Herts, United Kingdom

[73] Assignee: Mondex International Limited, London, United Kingdom

[21] Appl. No.: 09/075,975

[22] Filed: May 11, 1998

Related U.S. Application Data

[60] Provisional application No. 60/046,514, May 15, 1997, and provisional application No. 60/046,543, May 15, 1997.

[51] Int. Cl.$^7$ .................................................. G06K 19/06
[52] U.S. Cl. .......................................... 235/492; 235/380
[58] Field of Search ................................... 235/379, 380, 235/492; 705/41

[56] References Cited

U.S. PATENT DOCUMENTS

| | | |
|---|---|---|
| 4,214,230 | 7/1980 | Fak et al. . |
| 4,218,582 | 8/1980 | Hellman et al. . |
| 4,259,720 | 3/1981 | Campbell . |
| 4,302,810 | 11/1981 | Bouricius et al. . |
| 4,305,059 | 12/1981 | Benton . |
| 4,321,672 | 3/1982 | Braun et al. . |
| 4,341,951 | 7/1982 | Benton . |
| 4,405,829 | 9/1983 | Rivest et al. . |
| 4,408,203 | 10/1983 | Campbell . |
| 4,423,287 | 12/1983 | Zeidler . |
| 4,442,345 | 4/1984 | Mollier et al. . |
| 4,453,074 | 6/1984 | Weinstein . |
| 4,467,139 | 8/1984 | Mollier . |
| 4,498,000 | 2/1985 | Decavele et al. . |
| 4,536,647 | 8/1985 | Atalla et al. . |
| 4,578,530 | 3/1986 | Zeidler . |
| 4,605,820 | 8/1986 | Campbell, Jr. . |
| 4,629,872 | 12/1986 | Hällberg . |
| 4,630,201 | 12/1986 | White . |
| 4,650,978 | 3/1987 | Hudson et al. . |
| 4,669,596 | 6/1987 | Capers et al. . |
| 4,705,211 | 11/1987 | Honda et al. . |
| 4,709,136 | 11/1987 | Watanabe . |
| 4,709,137 | 11/1987 | Yoshida . |
| 4,727,243 | 2/1988 | Savar . |

(List continued on next page.)

FOREIGN PATENT DOCUMENTS

| | | |
|---|---|---|
| 0152024 | 8/1985 | European Pat. Off. . |
| 0157303 | 10/1985 | European Pat. Off. . |
| 0190733 | 8/1986 | European Pat. Off. . |
| 0218176 | 4/1987 | European Pat. Off. . |
| 0261030 | 3/1988 | European Pat. Off. . |
| 0275510 | 7/1988 | European Pat. Off. . |
| 0292248 | 11/1988 | European Pat. Off. . |
| 0325506 | 1/1989 | European Pat. Off. . |
| 0328289 | 8/1989 | European Pat. Off. . |

(List continued on next page.)

OTHER PUBLICATIONS

Davies et al., "Security for Computer Networks: An Introduction to Data Security in Teleprocessing and Electronic Funds Transfer," John Wiley & Sons 1984.

*Primary Examiner*—Michael G Lee
*Assistant Examiner*—Mark Tremblay
*Attorney, Agent, or Firm*—Baker Botts, L.L.P.

[57] ABSTRACT

There is provided an integrated circuit card having an associated operating mode. The integrated circuit card includes: a microprocessor; a memory coupled to the microprocessor; data stored in the memory representative of the operating mode; an operating system stored in the memory for processing selected information in a first IC card format; a shell application stored in the memory for processing the selected information in a second IC card format; and means for routing the selected information to either the operating system or the shell application responsive to the operating mode. The selected information may be a command, such as a file access command.

21 Claims, 9 Drawing Sheets

U.S. PATENT DOCUMENTS

| | | |
|---|---|---|
| 4,727,244 | 2/1988 | Nakano et al. . |
| 4,731,842 | 3/1988 | Smith . |
| 4,734,568 | 3/1988 | Watanabe . |
| 4,736,094 | 4/1988 | Yoshida . |
| 4,742,215 | 5/1988 | Daughters et al. . |
| 4,745,267 | 5/1988 | Davis et al. . |
| 4,746,788 | 5/1988 | Kawana . |
| 4,748,557 | 5/1988 | Tamada et al. . |
| 4,748,668 | 5/1988 | Shamir et al. . |
| 4,752,677 | 6/1988 | Nakano et al. . |
| 4,757,185 | 7/1988 | Onishi . |
| 4,757,543 | 7/1988 | Tamada et al. . |
| 4,759,063 | 7/1988 | Chaum . |
| 4,759,064 | 7/1988 | Chaum . |
| 4,767,920 | 8/1988 | Kitta et al. . |
| 4,778,983 | 10/1988 | Ushikubo . |
| 4,785,166 | 11/1988 | Kushima . |
| 4,786,790 | 11/1988 | Kruse et al. . |
| 4,797,542 | 1/1989 | Hara . |
| 4,797,920 | 1/1989 | Stein . |
| 4,798,941 | 1/1989 | Watanabe . |
| 4,802,218 | 1/1989 | Wright et al. . |
| 4,803,347 | 2/1989 | Sugahara et al. . |
| 4,811,393 | 3/1989 | Hazard . |
| 4,816,653 | 3/1989 | Anderl et al. . |
| 4,816,654 | 3/1989 | Anderl et al. . |
| 4,825,052 | 4/1989 | Chemin et al. . |
| 4,831,245 | 5/1989 | Ogasawara . |
| 4,833,595 | 5/1989 | Iijima . |
| 4,839,504 | 6/1989 | Nakano . |
| 4,839,792 | 6/1989 | Iijima . |
| 4,849,614 | 7/1989 | Watanabe et al. . |
| 4,853,522 | 8/1989 | Ogasawara . |
| 4,853,961 | 8/1989 | Pastor . |
| 4,874,935 | 10/1989 | Younger . |
| 4,877,945 | 10/1989 | Fujisaki . |
| 4,877,947 | 10/1989 | Mori . |
| 4,879,747 | 11/1989 | Leighton et al. . |
| 4,882,474 | 11/1989 | Anderl et al. . |
| 4,887,234 | 12/1989 | Iijima . |
| 4,891,503 | 1/1990 | Jewell . |
| 4,891,506 | 1/1990 | Yoshimatsu . |
| 4,900,904 | 2/1990 | Wright et al. . |
| 4,901,276 | 2/1990 | Iijima . |
| 4,906,828 | 3/1990 | Halpern . |
| 4,907,270 | 3/1990 | Hazard . |
| 4,926,480 | 5/1990 | Chaum . |
| 4,935,962 | 6/1990 | Austin . |
| 4,949,257 | 8/1990 | Orbach .................................... 364/401 |
| 4,961,142 | 10/1990 | Elliott et al. . |
| 4,969,188 | 11/1990 | Schoöbi . |
| 4,977,595 | 12/1990 | Ohta et al. . |
| 4,984,270 | 1/1991 | LaBounty . |
| 4,985,615 | 1/1991 | Iijima . |
| 4,987,593 | 1/1991 | Chaum . |
| 4,993,068 | 2/1991 | Piosenka et al. . |
| 4,995,081 | 2/1991 | Leighton et al. . |
| 4,996,711 | 2/1991 | Chaum . |
| 5,001,753 | 3/1991 | Davio et al. . |
| 5,003,594 | 3/1991 | Shinagawa . |
| 5,005,200 | 4/1991 | Fischer . |
| 5,010,239 | 4/1991 | Mita . |
| 5,012,074 | 4/1991 | Masada . |
| 5,012,076 | 4/1991 | Yoshida . |
| 5,014,312 | 5/1991 | Lisimaque et al. . |
| 5,016,274 | 5/1991 | Micali et al. . |
| 5,038,025 | 8/1991 | Kodera . |
| 5,068,894 | 11/1991 | Hoppe . |
| 5,093,862 | 3/1992 | Scwartz . |
| 5,097,115 | 3/1992 | Ogasawara et al. . |
| 5,120,939 | 6/1992 | Claus et al. . |
| 5,128,997 | 7/1992 | Pailles et al. . |
| 5,131,038 | 7/1992 | Puhl et al. . |
| 5,142,578 | 8/1992 | Matyas et al. . |
| 5,146,499 | 9/1992 | Geffrotin . |
| 5,148,481 | 9/1992 | Abraham et al. . |
| 5,161,231 | 11/1992 | Iijima . |
| 5,162,989 | 11/1992 | Matsuda .................................... 364/401 |
| 5,163,098 | 11/1992 | Dahbura . |
| 5,164,988 | 11/1992 | Matyas et al. . |
| 5,165,043 | 11/1992 | Miyahara et al. . |
| 5,166,503 | 11/1992 | Mizuta . |
| 5,175,416 | 12/1992 | Mansvelt et al. . |
| 5,180,901 | 1/1993 | Hiramatsu . |
| 5,191,193 | 3/1993 | Le Roux . |
| 5,191,608 | 3/1993 | Geronimi . |
| 5,200,999 | 4/1993 | Matyas et al. . |
| 5,201,000 | 4/1993 | Matyas et al. . |
| 5,202,922 | 4/1993 | Iijima . |
| 5,214,702 | 5/1993 | Fischer . |
| 5,224,162 | 6/1993 | Okamoto et al. . |
| 5,243,175 | 9/1993 | Kato . |
| 5,247,578 | 9/1993 | Pailles et al. . |
| 5,293,577 | 3/1994 | Hueske et al. . |
| 5,371,797 | 12/1994 | Bocinsky, Jr. . |
| 5,420,405 | 5/1995 | Chasek . |
| 5,452,431 | 9/1995 | Bournas . |
| 5,473,690 | 12/1995 | Grimonprez et al. . |
| 5,485,520 | 1/1996 | Chaum et al. . |
| 5,511,121 | 4/1996 | Yacobi . |
| 5,517,011 | 5/1996 | Vandenengel . |
| 5,530,232 | 6/1996 | Taylor . |
| 5,534,857 | 7/1996 | Laing et al. . |
| 5,539,825 | 7/1996 | Akiyama et al. . |
| 5,542,081 | 7/1996 | Geronimi . |
| 5,544,246 | 8/1996 | Mandelbaum et al. . |
| 5,546,523 | 8/1996 | Gatto . |
| 5,557,516 | 9/1996 | Hogan . |
| 5,574,269 | 11/1996 | Mori et al. . |
| 5,578,808 | 11/1996 | Taylor . |
| 5,581,708 | 12/1996 | Iijima . |
| 5,588,146 | 12/1996 | Leroux . |
| 5,649,118 | 7/1997 | Carlisle et al. .................................... 705/41 |
| 5,682,027 | 10/1997 | Bertina et al. . |
| 5,692,132 | 11/1997 | Hogan . |
| 5,699,528 | 12/1997 | Hogan . |
| 5,704,046 | 12/1997 | Hogan . |
| 5,705,798 | 1/1998 | Tarbox . |
| 5,708,780 | 1/1998 | Levergood et al. . |
| 5,715,314 | 2/1998 | Payne et al. . |
| 5,724,424 | 3/1998 | Gifford . |
| 5,754,762 | 5/1998 | Kuo et al. .................................... 395/186 |
| 5,796,831 | 8/1998 | Paradinas et al. . |
| 5,802,519 | 9/1998 | Jong .................................... 707/100 |
| 5,825,875 | 10/1998 | Ugon . |
| 5,912,453 | 6/1999 | Gungl .................................... 235/380 |

FOREIGN PATENT DOCUMENTS

| | | |
|---|---|---|
| 0354793 | 2/1990 | European Pat. Off. . |
| 0451936 | 10/1991 | European Pat. Off. . |
| 0466969 | 1/1992 | European Pat. Off. . |
| 0475837 | 3/1992 | European Pat. Off. . |
| 2667171 | 3/1992 | European Pat. Off. . |
| 0547741 | 9/1992 | European Pat. Off. . |
| 0537756 | 4/1993 | European Pat. Off. . |
| 0540095 | 5/1993 | European Pat. Off. . |
| 0559205 | 8/1993 | European Pat. Off. . |
| 0588339 | 3/1994 | European Pat. Off. . |
| 0594493 | 4/1994 | European Pat. Off. . |
| 0636998 | 2/1995 | European Pat. Off. . |
| 0647902 | 4/1995 | European Pat. Off. . |
| 0666550 | 8/1995 | European Pat. Off. . |

| | | | | | |
|---|---|---|---|---|---|
| 0707290 | 9/1995 | European Pat. Off. . | WO 9213322 | 8/1992 | WIPO . |
| 0686947 | 12/1995 | European Pat. Off. . | WO 9320538 | 10/1993 | WIPO . |
| 0751460 | 1/1997 | European Pat. Off. . | WO 9321612 | 10/1993 | WIPO . |
| 2536928 | 6/1984 | France . | WO 9522810 | 8/1995 | WIPO . |
| 266717 | 3/1992 | France . | WO 9619771 | 6/1996 | WIPO . |
| 2687816 | 8/1993 | France . | WO 9628795 | 9/1996 | WIPO . |
| 64-81084 | 3/1989 | Japan . | WO 9638825 | 12/1996 | WIPO . |
| 2592856 | 12/1996 | Japan . | WO 9843212 | 10/1998 | WIPO . |
| 2284689 | 6/1995 | United Kingdom . | WO 9101538 | 2/1999 | WIPO . |
| WO 8707062 | 11/1987 | WIPO . | WO 9910824 | 3/1999 | WIPO . |
| WO 8809019 | 11/1988 | WIPO . | WO 9916031 | 4/1999 | WIPO . |
| WO 9005960 | 5/1990 | WIPO . | | | |

IC CARD WITH SHELL FEATURE

CROSS-REFERENCE TO PRIORITY APPLICATIONS

This application claims the priority of U.S. Provisional Application Ser. No. 60/046,514, filed on May 15, 1997, entitled "Design for a Multi Application Smart Card," and U.S. Provisional Application Ser. No. 60/046,543, filed on May 15, 1997, entitled "Virtual Machine for a Multi Application Smart Card," which are incorporated by reference herein in their entireties.

BACKGROUND OF INVENTION

Integrated circuit (IC) cards are becoming increasingly used for many different purposes in the world today, principally because they are ideal tools for the delivery of distributed, secure information processing at a low cost. An IC card, also called a "smart card," is a card typically the size of a conventional credit card, but which contains a computer chip on the card. The computer chip on the IC card typically includes a microprocessor, read-only-memory (ROM), electrically erasable programmable read-only-memory (EEPROM), a random access memory (RAM), an input/output (I/O) mechanism, and other circuitry to support the microprocessor in its operations. The computer chip can execute one or more applications stored on the card. Examples of applications that IC cards are being used to store and execute include credit/debit, electronic money/purse, telephone calling card, and loyalty reward applications.

As the use and application of IC cards has increased, IC card standards have been promulgated. For example, the International Organization for Standardization (ISO) and the International Engineering Consortium (IEC) have promulgated several industry-wide standards for IC cards, ISO/IEC 7816-1 through ISO 7816-8. The ISO/IEC standards provide, for example, general guidelines for file structures and referencing methods so that various applications and IC card operating systems can understand one another and work in a cohesive manner. Additionally, in the field of payment systems (such as credit and debit card systems), the EMV '96 Integrated Circuit Card Specification for Payment Systems, Version 3.0, Jun. 30, 1996, available from MasterCard International Incorporated®, specifies file structures and file referencing methods that are generally compliant with ISO/IEC standards 7816-4 and 7816-5. Nonetheless, proprietary IC card standards exist that are not compliant with ISO/IEC standards.

The existence of multiple IC card standards is problematic to the IC card manufacturer, who is required to produce different versions of its IC cards, with different operating systems that are compatible with the different standards. Moreover, since operating systems are typically loaded into the ROM of an IC card when it is initially produced, each time a standard is updated or a new standard is adopted, an IC card manufacturer may be required to distribute new IC cards with an updated operating system compatible with the new or updated standard.

It would advantageous to the card manufacturer, card issuer, application provider, and card user if the operating system of an IC card was not required to be updated each time a new or updated IC card standard was promulgated.

SUMMARY OF THE INVENTION

The present invention solves the aforementioned problems by introducing a "shell" application that executes "on top" of the operating system and that handles the implementation of IC card standards that are not compatible with the initially loaded operating system of the IC card. Advantageously, the shell application supplements the IC card standards with which the IC card is compatible. Thus, as standards change or new standards are adopted, an IC card needs to be updated only with a new shell application, rather than having to be updated with a new operating system.

According to a preferred embodiment of the present invention, there is provided an integrated circuit card having an associated operating mode. The integrated circuit card includes: a microprocessor; a memory coupled to the microprocessor; data stored in the memory representative of the operating mode; an operating system stored in the memory for processing selected information in a first IC card format; a shell application stored in the memory for processing the selected information in a second IC card format; and means for routing the selected information to either the operating system or the shell application responsive to the operating mode. The selected information may be a command, such as a file access command. In addition, the selected information may be associated with a file structure format.

In accordance with the present invention, there is also provided a method of loading an application onto an IC card, wherein the application has an associated file mode type and the IC card has an associated operating mode. The method includes the steps of determining whether the file mode type of the application is a predetermined file mode type, and changing the operating mode of the IC card if the file mode type corresponds to the predetermined file mode type. The predetermined file mode type is, for example, a "shell" file mode type, and the operating mode of the IC card is, for example, either "OS" or "shell." Thus, when an application has an associated file mode type of "shell," the operating mode of the IC card is changed from "OS" to "shell."

Preferably, a shell application is not loaded unless it is the first application loaded. In this way, operability of the non-shell applications loaded onto the IC card may be guaranteed. Thus, the method of loading an application according to the present invention preferably further includes the steps of: determining whether any other applications have already been loaded onto the IC card; loading the application onto the IC card if the file mode type of the application corresponds to the predetermined file mode type and no other applications have already been loaded onto the IC card; and changing the operating mode of the IC card if the file mode type corresponds to the predetermined file mode type and no other applications have already been loaded onto the IC card.

In accordance with another preferred embodiment of the present invention, there is also provided a method of routing a command by an operating system of an IC card, wherein the IC card has an associated operating mode. The method includes the steps of determining whether the operating mode of the IC card is a predetermined operating mode; and routing the command directly to an application if the operating mode of the IC card corresponds to the predetermined operating mode. For example, assuming a SELECT FILE command is received by an IC card from a terminal and the IC card has a shell application loaded thereon, if the operating mode of the IC card and the predetermined operating mode are both "shell," the operating system would route the SELECT FILE command to the shell application.

Preferably, the method of routing further includes the steps of: if the operating mode of the IC card does not correspond to the predetermined operating mode, determining whether the command is a select file command supported by the operating system; and routing the command to an operating system routine responsible for the select file command if the command is a select file command supported by the operating system.

Preferably, the IC card further comprises a currently selected file having an associated file type and the method of routing further comprises the steps of: if the operating mode of the IC card does not correspond to the predetermined operating mode, determining whether the file type of the currently selected file is supported by the operating system; and routing the command to an operating system routine responsible for the file type if the file type of the currently selected file is supported by the operating system. If the file type of the currently selected file is not supported by operating system, the method further comprises the step of routing the command to an application.

In accordance with another preferred embodiment of the present invention, there is also provided a method of delegating control between applications by an operating system of an IC card, wherein the IC card is for use with a defined IC card format and has an associated operating mode. The method includes the steps of storing a shell application in the IC card for communicating with the operating system and for processing information in a format compliant with the defined IC card format; receiving a request by the operating system from a first application for delegating control to a second application; determining whether the operating mode of the IC card is a predetermined operating mode; determining whether the second application corresponds to the shell application; and failing the request for delegating control if the operating mode of the IC card corresponds to the predetermined operating mode and the second application corresponds to the shell application.

In accordance with another preferred embodiment of the present invention, there is also provided a method of initiating communication between an IC card and a terminal, wherein the IC card comprises a microprocessor and a memory, the memory having stored therein an operating system, a shell application, and data representative of an operating mode of the IC card, the operating mode representing whether selected information is to be routed to the operating system or the shell application. The method of initiating includes the steps of receiving a reset signal by the IC card from the terminal; and returning an answer-to-reset from the IC card to the terminal based on the operating mode of the IC card.

Preferably, a plurality of answer-to-reset files are stored in the memory of the IC card, and the step of returning an answer-to-reset comprises selecting one of the answer-to-reset files based on the operating mode. The selected information may be a command, such as a file access command. In addition, the selected information may be associated with a file structure format.

DETAILED DESCRIPTION OF THE INVENTION

Figure 1:
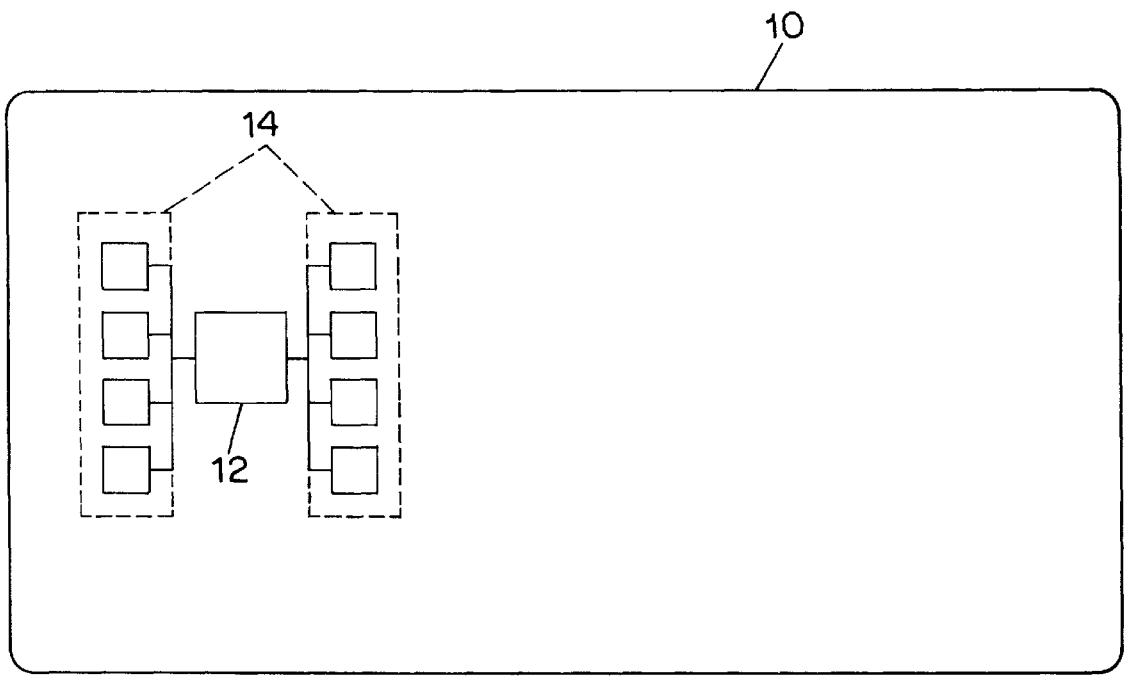
FIG. 1 is a schematic representation of an IC card in accordance with a preferred embodiment of the present invention.

FIG. 1 provides a schematic representation of a typical IC card 10 that can be used with the presently claimed invention. The IC card 10 includes an integrated circuit 12 and one or more electrical contacts 14, connected to the integrated circuit 12, for communication between the integrated circuit 12 and devices outside the IC card 10.

Figure 2:
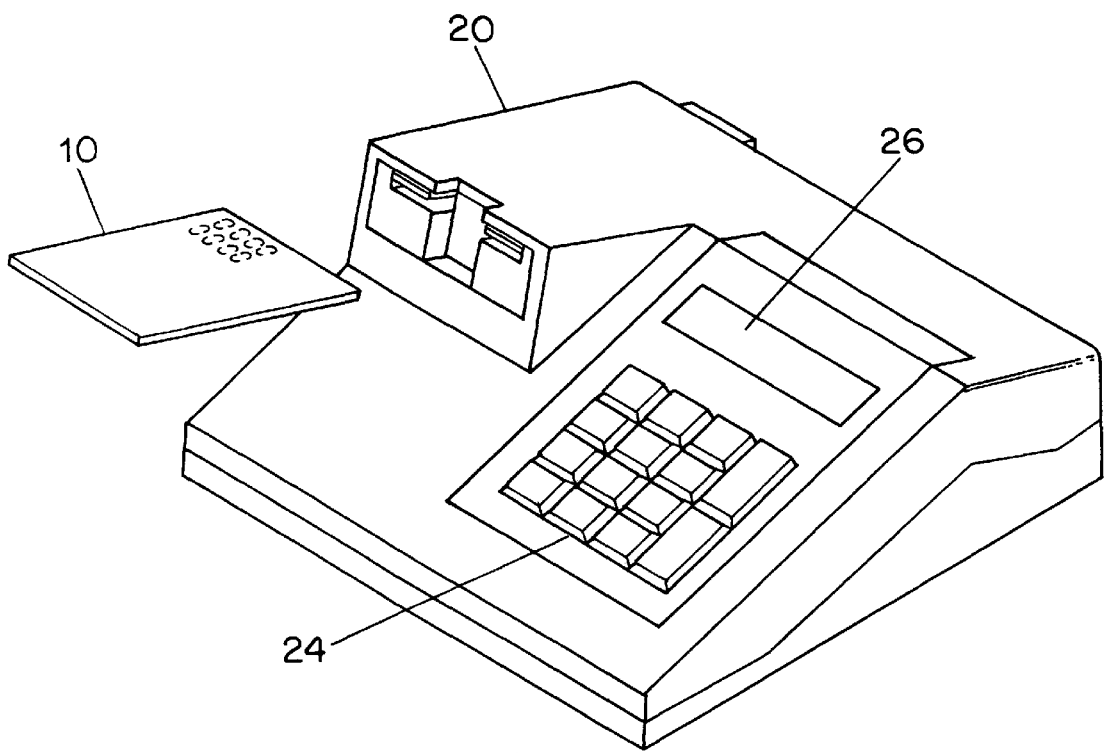
FIG. 2 is a perspective view of an IC card and terminal in accordance with a preferred embodiment of the present invention.

FIG. 2 shows an example of a device with which the IC card 10 communicates. As used in this specification and the appended claims, the term "terminal" shall be used to generically describe devices with which an IC card may communicate. A typical terminal 20, as shown in FIG. 2, includes a card reader 22, a keypad 24, and a display 26. The keypad 24 and the display 26 allow a user of the IC card 10 to interact with the terminal. The keypad 24 allows the user to select a transaction, to enter a personal identification number ("PIN"), and to enter transactional information. The display 26 allows the user to receive informational messages and prompts for data entry. Other types of terminals may include IC card compatible ATM machines and telephones.

Figure 3:
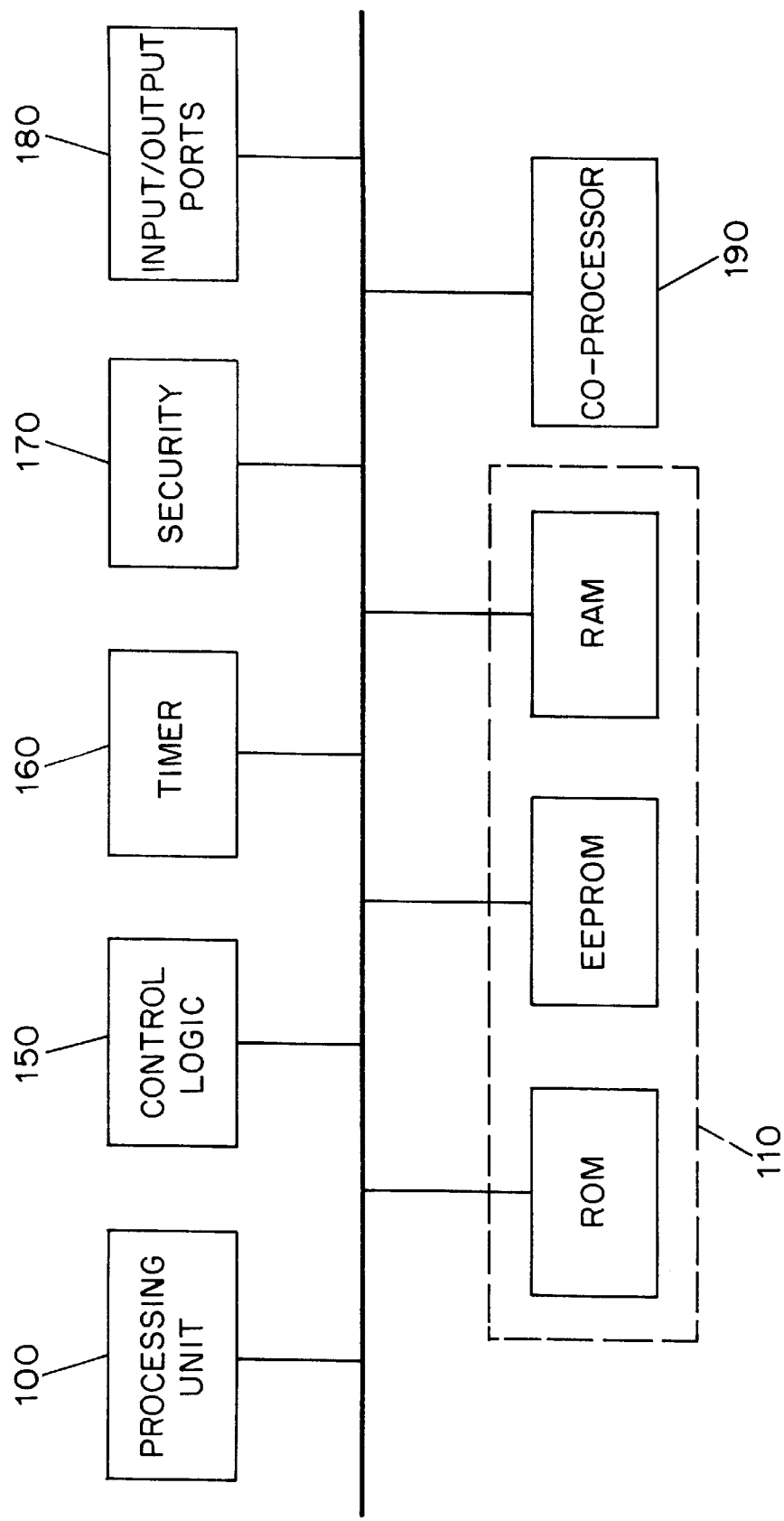
FIG. 3 is a functional block diagram of an IC card in accordance with a preferred embodiment of the present invention.

FIG. 3 provides a functional block diagram of the integrated circuit 12. At a minimum, the integrated circuit 12 includes a processing unit 100 and a memory unit 110. Preferably, the integrated circuit 12 also includes control logic 150, a timer 160, security circuitry 170, input/output ports 180, and a co-processor 190. The control logic 150 provides, in conjunction with the processing unit 100, the control necessary to handle communications between the memory unit 110 and input/output ports 180. The timer 160 provides a timing reference signal for the processing unit 100 and the control logic 150. The security circuitry 170 preferably provides fusible links that connect the input/output ports 180 to internal circuitry for testing during manufacturing. The fusible links are burned after completion of testing to limit later access to sensitive circuit areas. The co-processor 190 provides the ability to perform complex computations in real time, such as those required by cryptographic algorithms.

The memory unit 110 may include different types of memory, such as volatile and non-volatile memory and read-only and programmable memory. For example, as shown in FIG. 3, the memory unit 110 may include read-only memory (ROM), electrically erasable programmable read-only memory (EEPROM), and random-access memory (RAM).

The memory unit 110 stores IC card data such as secret cryptographic keys and a user PIN. The secret cryptographic keys may be any type of well-known cryptographic keys, such as the private keys of public-key pairs. Preferably, the secret cryptographic keys are stored in a secure area of ROM or EEPROM that is either not accessible or has very limited accessibility from outside the IC card.

The memory unit 110 also stores the operating system of the IC card. The operating system loads and executes IC card applications and provides file management and other basic card services to the IC card applications. Preferably, the operating system is stored in ROM.

In addition to the basic services provided by the operating system, the memory unit 110 may also include one or more IC card applications. For example, if the IC card is to be used as an electronic cash card, an application called MONDEX™ PURSE might be included on the IC card, which loads an electronic value of a certain currency from a user's account in a financial institution onto the IC card. An application may include both program and data files, which may be stored in either ROM or EEPROM.

To enable the inter-operability of different terminals with different IC cards and applications, standards have been promulgated with respect to the organization of files stored on an IC card. For example, in the payment systems industry, the EMV '96 Integrated Circuit Card Specification for Payment Systems, Version 3.0, Jun. 30, 1996, available from MasterCard International Incorporated® (hereinafter the "EMV Specification"), incorporated herein by reference in its entirety, sets forth a hierarchical tree structure for accessing files, which is generally compliant with the ISO/IEC 7816-4 and 7816-5 standards. An illustrative example of such a hierarchical tree structure is provided in FIG. 4.

Figure 4:
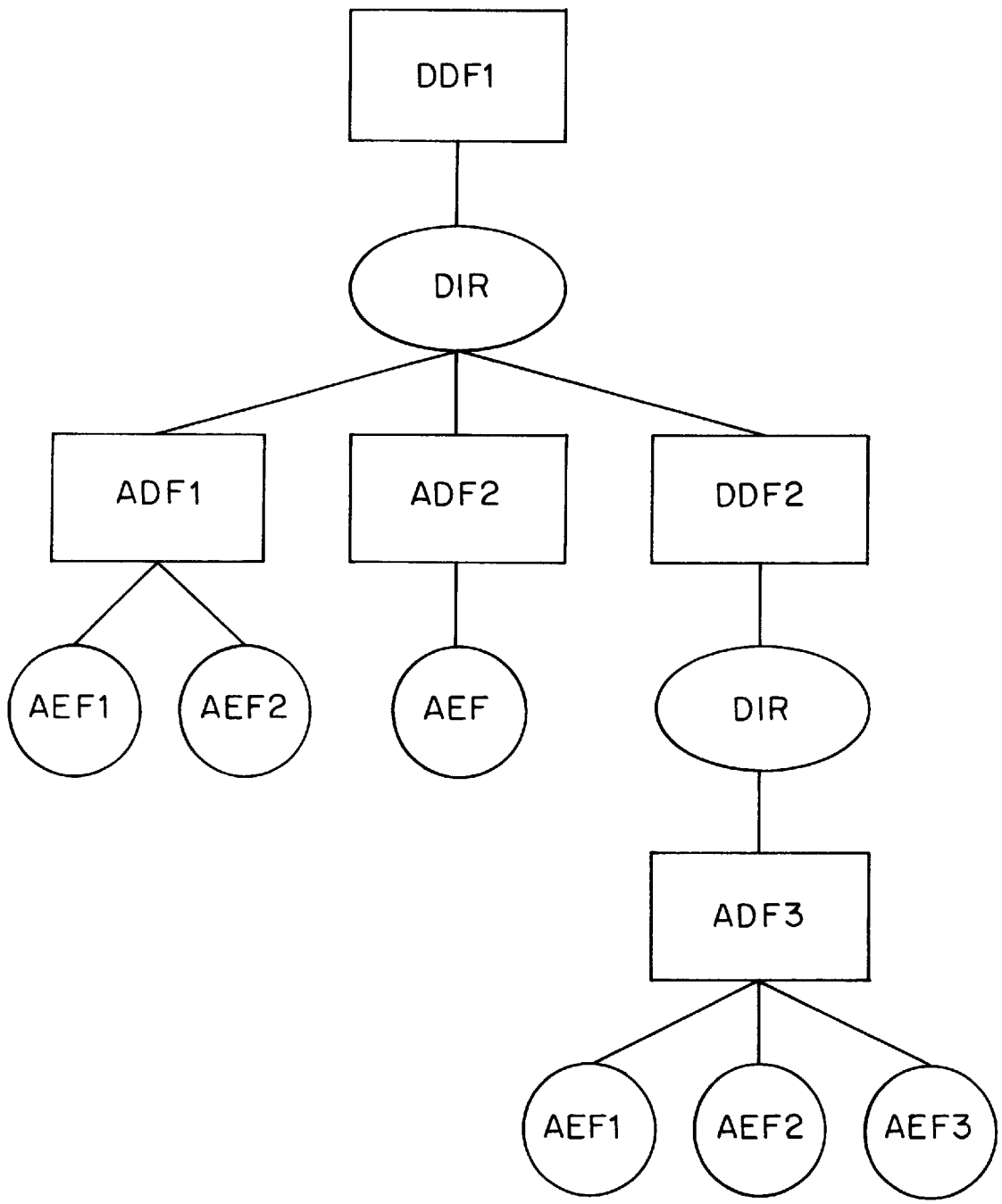
FIG. 4 is an exemplary hierarchical file structure according to the EMV Specification.

In FIG. 4, there are shown four types of file categories: the Directory Definition File (DDF), the Directory File (DIR), the Application Definition File (ADF), and the Application Elementary File (AEF). According to the EMV Specification, each DDF contains one DIR. Each DIR may contain one or more ADF and/or DDF. Each ADF contains one or more AEF, which are files containing data related to a particular application.

According to the EMV Specification, files are referenced either by a unique name or by a short file identifier (SFI). A DDF or ADF is referenced by its unique name using a SELECT command. Once a particular DDF or ADF is selected, a corresponding DIR or AEF is referenced with an SFI using a READ RECORD command. In the case of a DIR, the SFI is in the range of I to 10. In the case of an AEF, the SFI is in the range 1 to 30. The EMV Specification sets forth at least one mandatory DDF with a unique name of "1PAY.SYS.DDF01."

The format for a SELECT command for selecting a DDF or ADF according to the EMV Specification is shown in Table 1. In response to a SELECT command for a DDF, an IC card returns the SFI of the DIR attached to the DDF. When an ADF is selected, an IC card returns information that the terminal may use, in conjunction with other commands, to retrieve the SFI of AEFs related to the ADF.

Once the SFI of a DIR or AEF is known, a terminal may use the READ RECORD command to read the records of the DIR or AEF. The format of the READ RECORD command according to the EMV Specification is shown in Table 2.

TABLE 1

SELECT Command Format

| Byte Number | Value |
|---|---|
| 1 | Hexadecimal "00" |
| 2 | Hexadecimal "A4" |
| 3 | Hexadecimal "04" |
| 4 | Hexadecimal "00" |
| 5 | Length of File Name (Hexadecimal "05"–"10") |
| 6–21 | File Name (number of bytes variable depending on length of file name) |
| Last | Hexadecimal "00" |

TABLE 2

READ RECORD Command Format

| Byte Number | Value |
|---|---|
| 1 | Hexadecimal "00" |
| 2 | Hexadecimal "B2" |
| 3 | Record Number |
| 4 | SFI |
| 5 | Hexadecimal "00" |

Although the EMV Specification sets a standard for file organization within the payment systems industry, other IC card file organization standards may exist in other industries. Some may be proprietary and may not be generally compatible with the EMV Specification or ISO/IEC 7816-4 or 7816-5.

Typically, an IC manufacturer who desires to produce IC cards compatible with the EMV Specification and other proprietary specifications must produce IC cards with different operating systems to implement the different file structures and different file referencing and access methods defined by the various specifications. According to the presently claimed invention, however, a manufacturer may produce an IC card with a single operating system and execute different shell applications to implement the different standards.

FIGS. 5A to 9 are flowcharts illustrating a preferred embodiment of IC card operating system routines capable of supporting a shell application. In the embodiment of FIGS. 5A to 9, the operating system is a multiple application operating system that runs on IC cards, such as the MULTOS™ operating system from Mondex International Limited. Such an operating system includes routines for loading and deleting applications, routines for routing commands to appropriate operating system processes or applications, routines for handling delegation of processing between applications, and routines for handling the answer-to-reset (ATR) message.

In the embodiment of FIGS. 5A to 9, only one shell application can be loaded onto an IC card at any one time. Once the shell application is loaded, it is valid for all applications loaded on the IC card. Preferably, the operating system has a delegation feature, such as the delegation feature described in the United States patent application entitled "Multi-Application IC Card with Delegation Feature," by Everett et al., filed Apr. 23, 1998, which is hereby incorporated by reference. When the shell application receives a command from the operating system, it interprets the command and/or delegates control to the application associated with the command. If control is delegated to an application, when the application is finished, it returns control to the shell application. The shell application then returns any response to the operating system in the proper format for transmission to the terminal.

Although for the sake of simplicity the preferred embodiment loads only a single shell application at a time, the present invention is not limited to such an embodiment. It is within the scope of the present invention for multiple shell applications to be loaded onto an IC card and to be used with different sets of applications.

As a matter of notation, the data elements referred to in the flowcharts of FIGS. 5A to 9 follow a dot notation convention where the data element following the dot (".") is a component of the data element preceding the dot. For example, the data element file_mode includes two components:file_mode_type and application_id. In the dot notation used, the first component data element is referred to as file_mode.file_mode_type and the second component data element is referred to as file_mode.application_id.

Figure 5A:
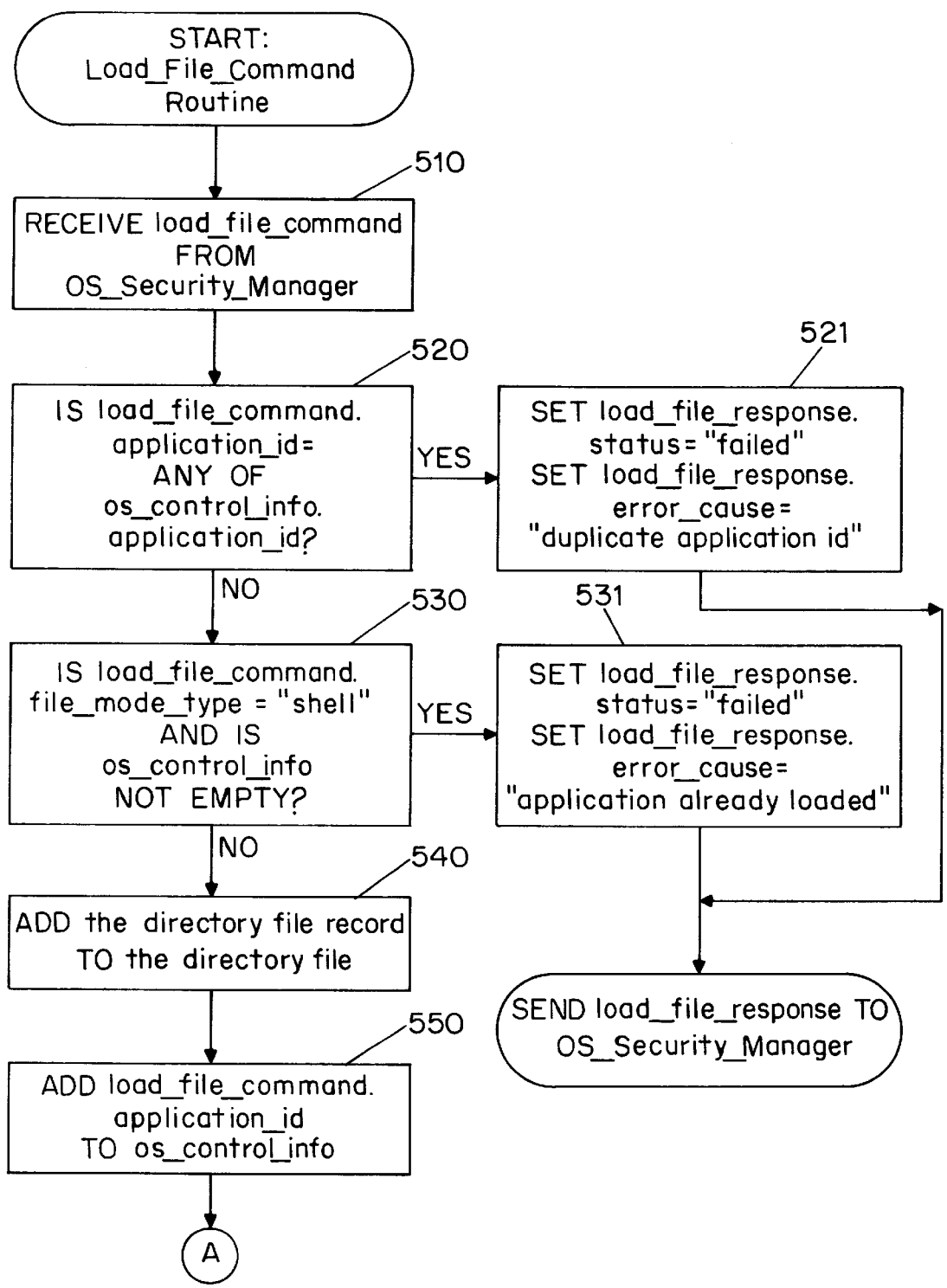
FIGS. 5A and 5B are flowcharts illustrating the steps for a load_file command used in accordance with a preferred embodiment of the present invention.
Figure 5B:
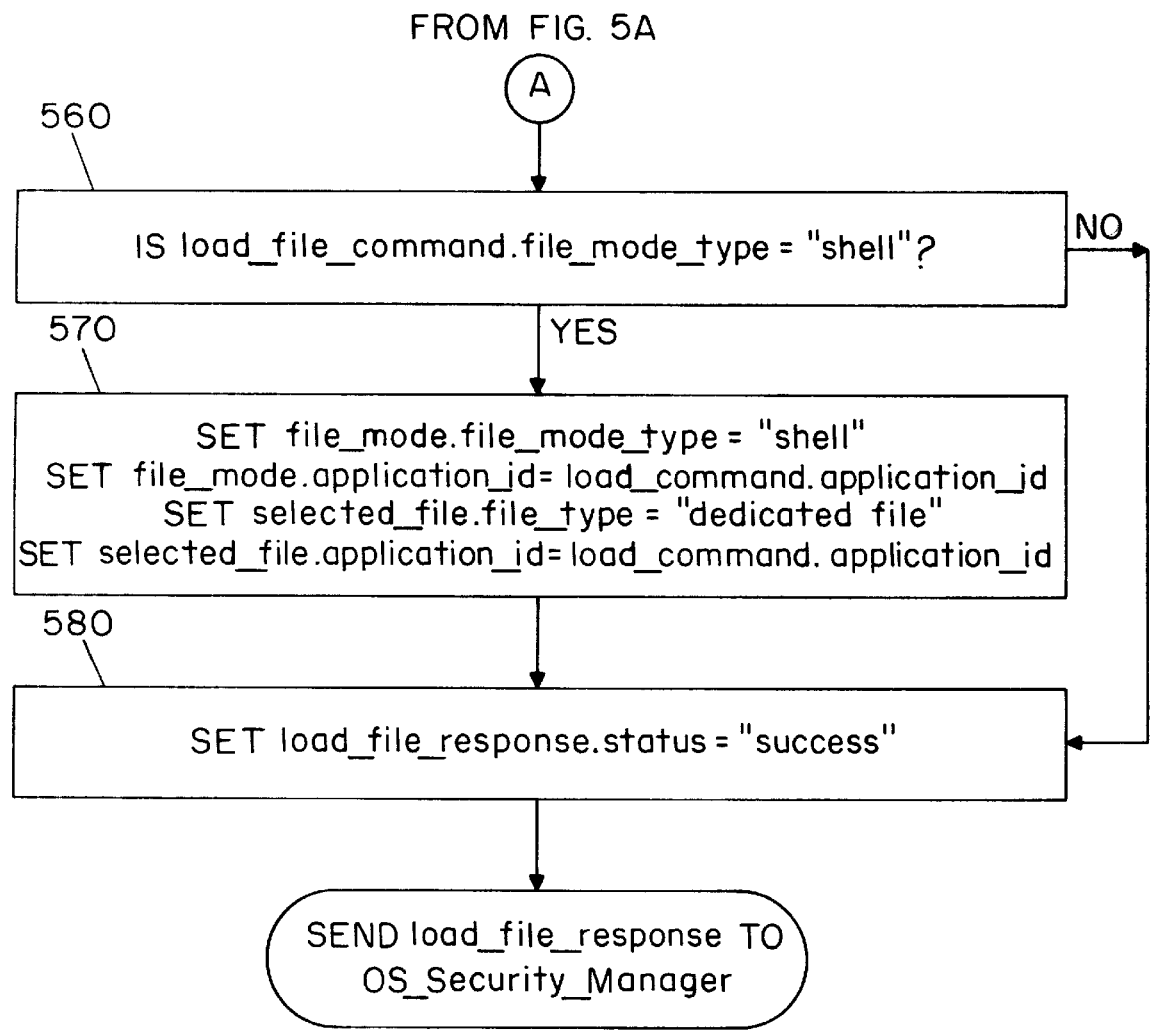

FIGS. 5A and 5B are flowcharts illustrating the implementation of a file loading routine by an operating system capable of supporting a shell application. In step 510, the routine receives the file loading command load_file_command from the security manager of the operating system, OS_Security_Manager. In step 520, after receiving the command, the routine checks whether the application identification number associated with the command, load_file_command.application_id, is present in the operating system control information, os_control_info.application_id. If the application identification number is already present, in step 521, the routine sets the response status load_file_response.status to "failed" and sets the error description load_file_response.error_cause to "duplicate application id." This error response indicates that the application is already loaded and cannot be loaded again. The error response load_file_response is then returned to the OS_Security_Manager.

If the application identification number of the application to be loaded is not present, in step 530, the routine checks the file mode type of load_file_command. The file mode type may be, for example, "shell" or "non-shell." A "shell" file mode type indicates that the application to be loaded is a shell application, while a "non-shell" file mode type indicates that the application to be loaded is not a shell application.

If the application to be loaded is a shell application, the routine further checks whether os_control_info is empty. If os_control_info is not empty, then one or more applications have already been loaded onto the IC card. If this is the case, in step 531, the routine sets the response status load_file_response.status to "failed" and sets the error description load_file_response.error_cause to "application already loaded." This error response is a result of the restriction that the shell application is to be valid for all applications loaded onto the IC card. To ensure that all applications will operate correctly with the shell application, the shell application must be the first application loaded onto the IC card.

Assuming that an error condition has not been triggered in steps 520 and 530, the directory file and os_control_info are updated with the appropriate application information in steps 540 and 550.

With reference to FIG. 5B, in step 560, the file mode type of load_file_command is checked once again. If the file mode type is "shell," then in step 570, the file_mode and the selected_file data elements are updated. The file_mode data element contains both the file_mode type of the IC card and the application_id of the shell application. The file_mode.file_mode_type variable represents the operating mode of the IC card and, thus, may also be referred to as the "operating mode." The operating mode of the IC card may be, for example, either "OS" or "shell." "OS" mode indicates that a shell is not loaded, while "shell" mode indicates that a shell is loaded. The selected_file data element contains the application_id and the file_type of the currently selected file.

In step 570, file_mode.file_mode_type is set to "shell." The file_mode.file_mode_type represents the operating mode of the IC card and, thus, is also referred to as the "operating mode." In addition, the application identification number of the currently selected file is set to the application identification number of the shell application. The file_type of the selected file is set to "dedicated file," indicating that file commands are not to be handled by the operating system.

In step 580, the response status load_file_response.status is set to "success" and is returned to the OS_Security_Manager.

Figure 6:
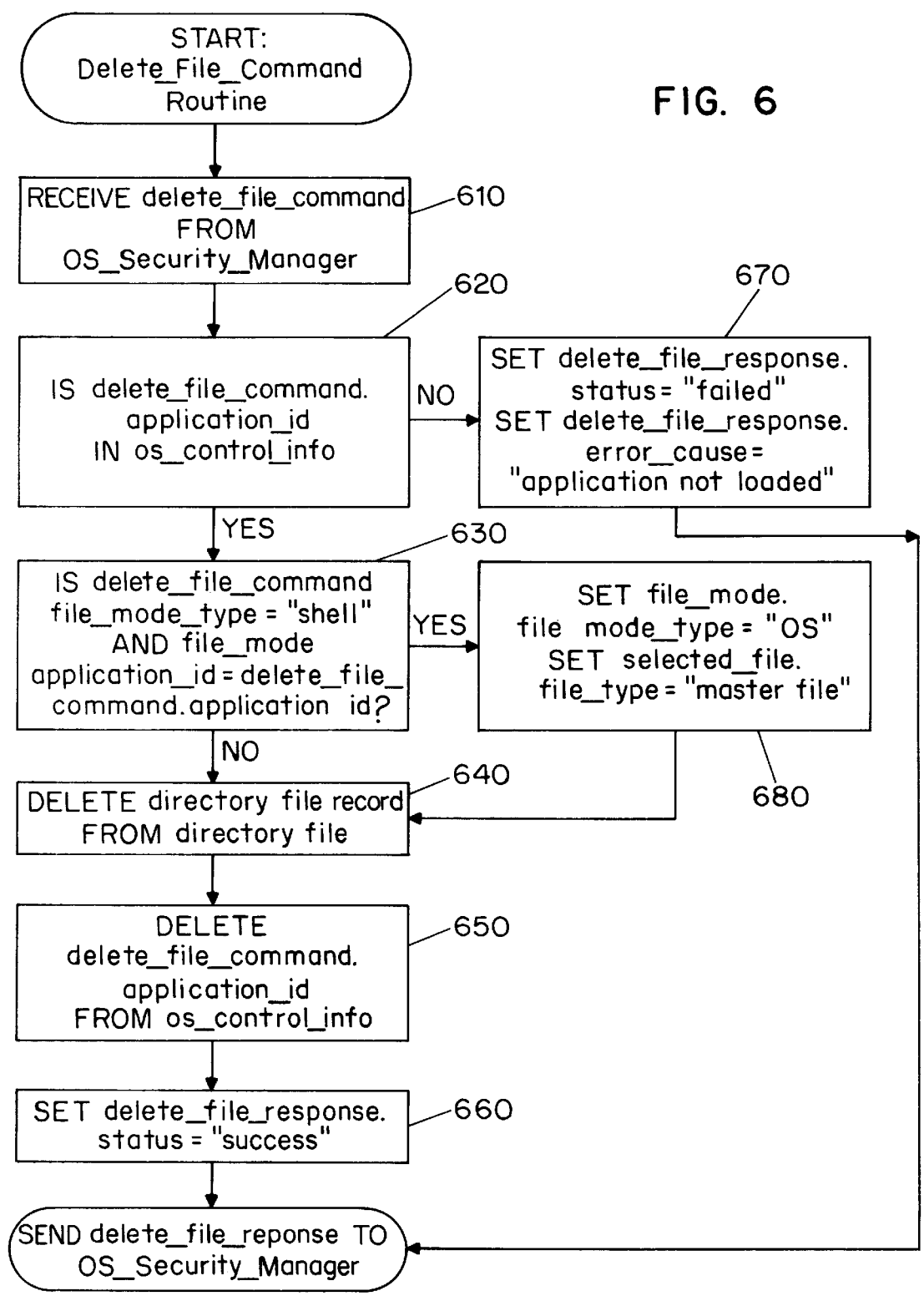
FIG. 6 is a flowchart illustrating the steps for a delete_file command used in accordance with a preferred embodiment of the present invention.

FIG. 6 is a flowchart illustrating the implementation of a file deleting routine by an operating system capable of supporting a shell application. In step 610, a delete_file_command is received from the OS_Security_Manager. In step 620, checking is performed to verify that the application being deleted exists in os_control_info—i.e., that the application is loaded on the IC card. If the application identification number is not in os_control_info, then in step 670, the response status delete_file_response.status is set to "failed" and the error description delete_file_response.error_cause is set to "application not loaded."

If the application is loaded on the IC card, in step 630 checking is performed to determine whether the file mode type of the application being deleted, delete_file_command.file_mode_type, is equal to "shell." Checking is also performed to determine whether the application identification number of the application being deleted, delete_file_command.application_id, is equal to the application identification number assigned to the file mode of the IC card, file_mode.application_id. In short, checking is performed to determine whether a loaded shell application is being deleted.

If a loaded shell application is being deleted, in step 680, file_mode.file_mode_type is set to "OS" and selected_file.file_type is set to the default file type for the IC card, i.e., "master file."

In step 640, the directory file record corresponding to the application is deleted from the directory in which it is stored. In step 650, the application identification number of the application is deleted from os_control_info. In step 660, delete_file_response.status is set to "success" and the response status is returned to the OS_Security_Manager.

Figure 7:
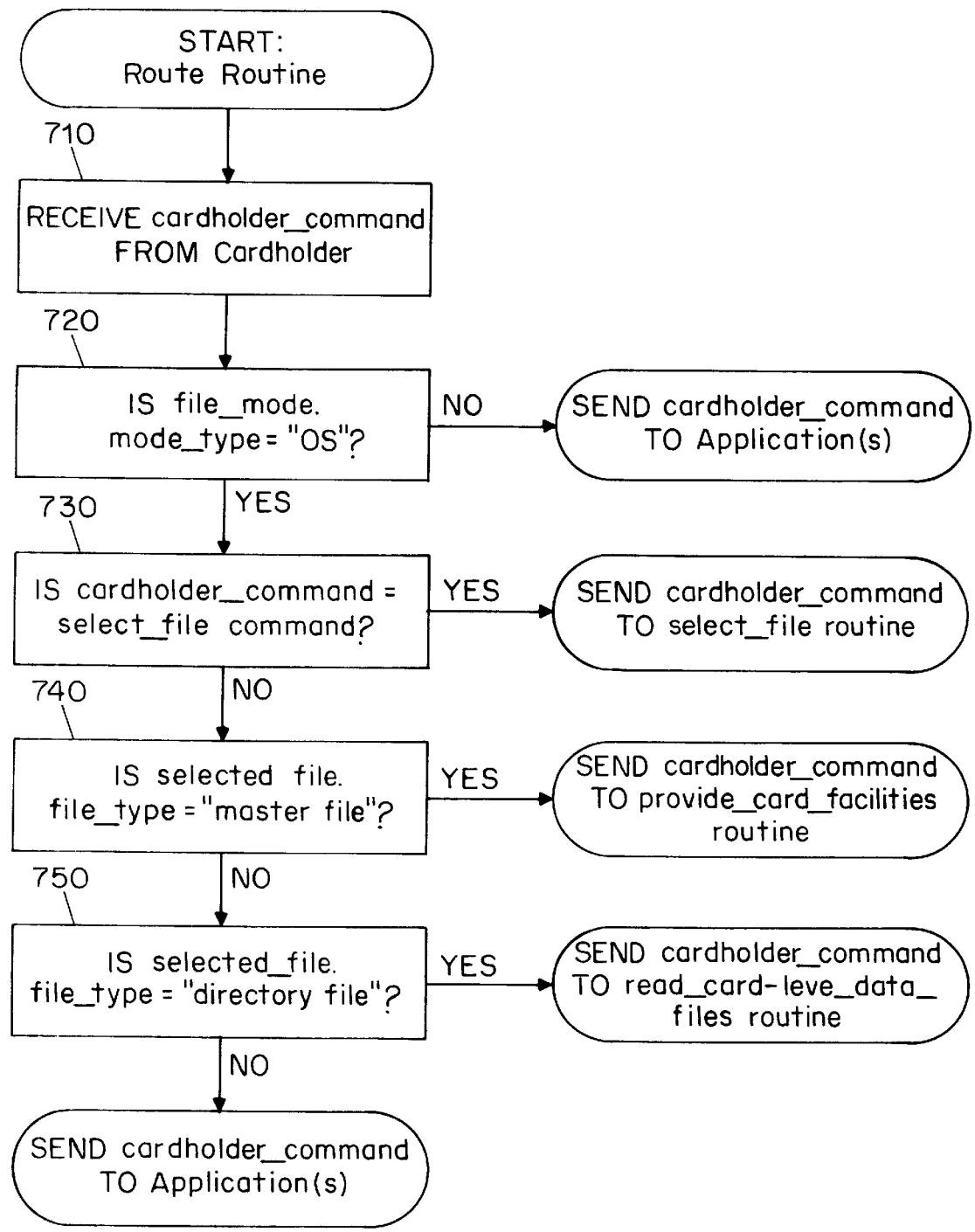
FIG. 7 is a flowchart illustrating the steps for a route command used in accordance with a preferred embodiment of the present invention.

FIG. 7 is a flowchart illustrating the implementation of a command routing routine by an operating system capable of supporting a shell application. In step 710, the route routine receives a command from the cardholder—i.e., a command from outside of the IC card. In step 720, checking is performed to determine the operating mode of the IC card. If file_mode.file_mode_type is not equal to "OS," a shell application has been loaded onto the IC card. Thus, the command from the cardholder is sent directly to the currently selected application or applications. In the typical case, the currently selected application will be the shell application. It may be the case, however, that the shell application has delegated control to another application and that that application receives and processes the command directly.

If the operating mode of the IC card is equal to "OS," the various conditions defined in steps 730 to 750 are checked. In step 730, if the command is a select_file command, the command is sent to the select_file routine of the operating system. In step 740, if the file type of the currently selected file is "master file," the command is sent to the provide_card_facilities routine of the operating system, which handles commands associated with the master file type. Similarly, in step 750, if the file type is "directory file," the command is sent to the read_card-level_data_files routine of the operating system, which handles commands associated with the directory file type. If none of the conditions in steps 730 to 750 are satisfied, then the selected file must be an application. Therefore, the command is sent to the currently selected applications.

Figure 8:
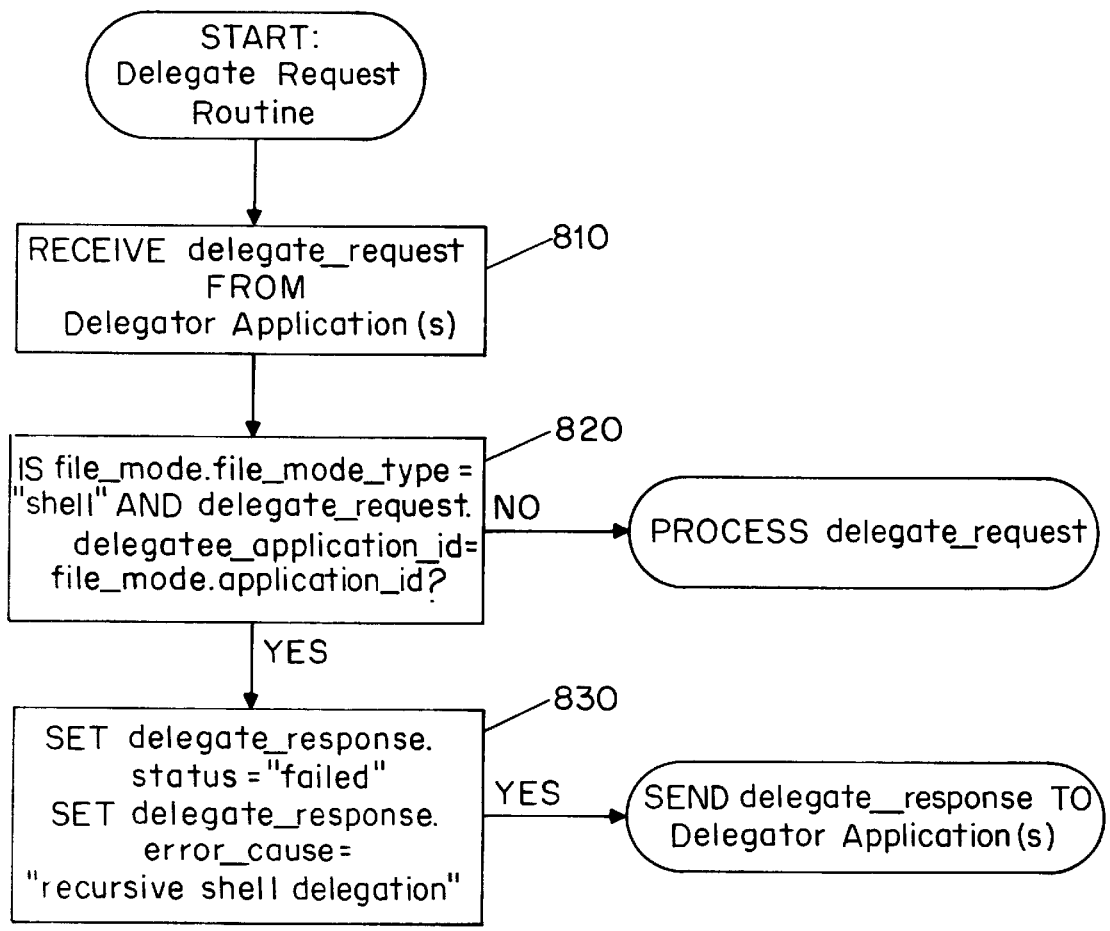
FIG. 8 is a flowchart illustrating the steps for a delegate_request command used in accordance with a preferred embodiment of the present invention.

FIG. 8 is a flowchart illustrating a delegate request checking routine that is necessary if an operating system supports both a shell application and a delegate feature. In step 810, a delegate_request is received from an application. In step 820, checking is performed to determine whether the operating mode of the IC card is "shell" and whether the application identification number of the delegated application (the application to which control is being sought to be transferred) is the same as the application identification of the shell application of the IC card. If both conditions are true, then an application is attempting to delegate control to the shell application. Since the shell application is the first application loaded and selected, and thus delegates control to all other applications, such a delegation would be recursive. Recursive delegation is not allowed. In step 830, therefore, delegate_response.status is set to "failed" and delegate_response.error_cause is set to "recursive shell delegation." The delegate response is returned to the delegator applications. In step 820, if it is determined that the delegator application has submitted a proper, non-recursive delegate request, the request is processed in accordance with the operating system's delegate handling procedures.

Figure 9:
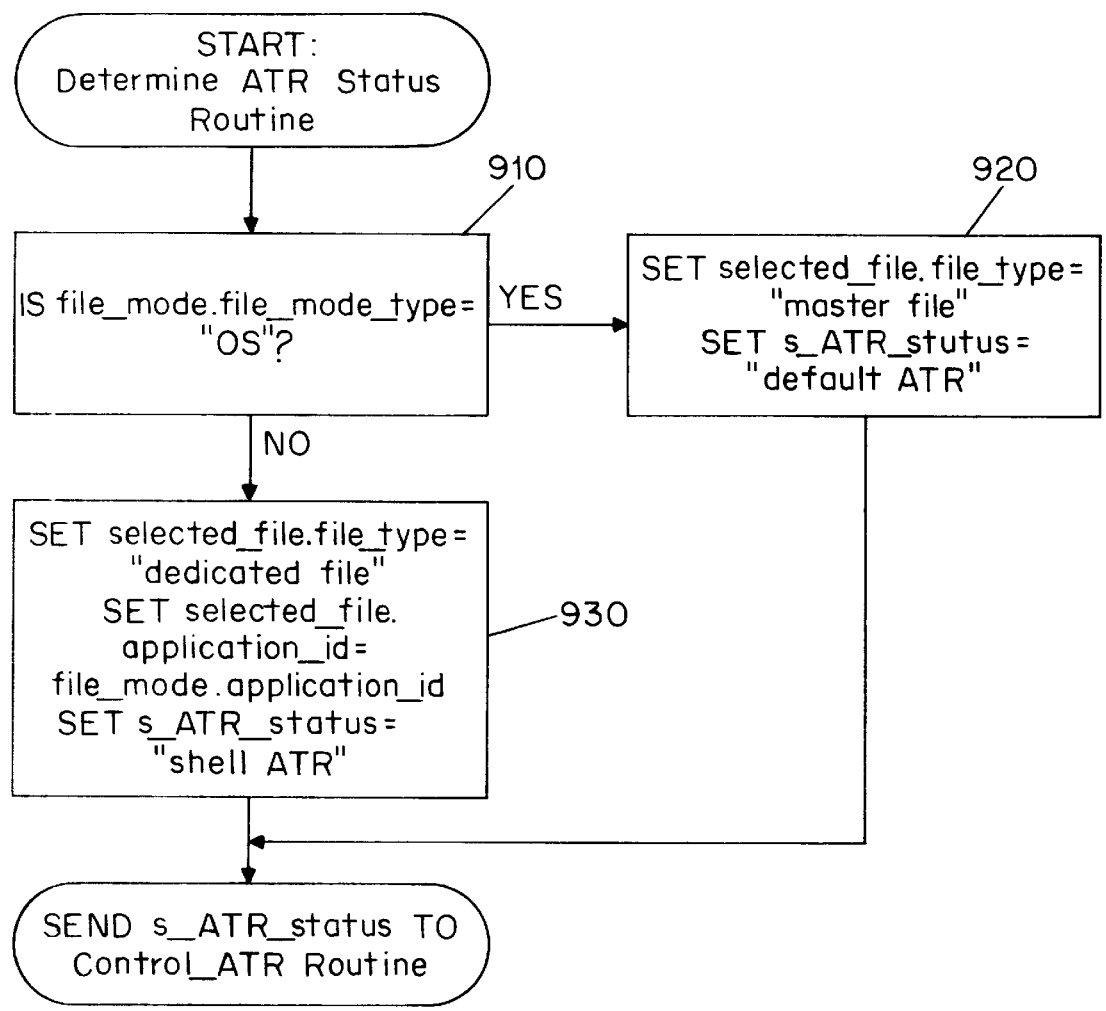
FIG. 9 is a flowchart illustrating the steps for a determine_ATR_status command used in accordance with a preferred embodiment of the present invention.

When an IC card is inserted into a terminal, it receives a reset signal. To initiate communication with the terminal, the IC card must respond to the reset signal with an appropriate answer-to-reset (ATR) message. FIG. 9 is a flowchart illustrating an ATR routine for an IC card operating system that supports a shell application.

In step 910, the operating mode of the IC card is checked. If the file_mode.file_mode_type is equal to "OS," in step 920, the file type of selected_file is set to the default "master file" and s_ATR_status is set to "default ATR." Otherwise, if the operating mode of the IC card is "shell," in step 930, the file type and application identification number of the selected file are set to "dedicated file" and file_mode.application_id, respectively. s_ATR_status is set to "shell ATR." In both cases, s_ATR_status is returned to the control_ATR routine of the operating system. Using s_ATR_status, the control_ATR routine responds with the appropriate ATR to the reset signal from the terminal. The appropriate ATR may be stored in different files on the IC card, which are selected based on s_ATR_status.

Although the present invention has been described with reference to certain preferred embodiments, various modifications, alterations, and substitutions will be known or obvious to those skilled in the art without departing from the spirit and scope of the invention, as defined by the appended claims.

I claim:

1. An integrated circuit card having an associated operating mode, comprising:

a microprocessor;

a memory coupled to said microprocessor;

data stored in said memory representative of said operating mode;

an operating system stored in said memory for processing selected information in a first IC card format;

a shell application stored in said memory for processing said selected information in a second IC card format; and means responsive to said operating mode for routing said selected information to either said operating system or said shell application.

2. The integrated circuit card of claim 1, wherein said second IC card format is different than said first IC card format.

3. The integrated circuit card of claim 1, wherein said selected information is a command.

4. The integrated circuit card of claim 3, wherein said command is a file access command.

5. The method of claim 1, wherein said selected information is associated with a file structure format.

6. The integrated circuit card of claim 1, further comprising:

a non-shell application stored in said memory;

means for receiving a request by said operating system from said non-shell application for delegating control to a delegated application;

means for determining whether said operating mode of said IC card is a predetermined operating mode;

means for determining whether said delegated application corresponds to said shell application; and means for failing the request for delegating control if the operating mode of said IC card corresponds to said predetermined operating mode and said delegated application corresponds to said shell application.

7. A method of loading an application onto an IC card, wherein said application has an associated file mode type and said IC card includes a microprocessor, memory coupled to said microprocessor, and data stored in said memory representative of an operating mode associated with said IC card, said method comprising the steps of:

determining whether the file mode type of said application is a predetermined file mode type; and changing the operating mode of said IC card if said file mode type corresponds to said predetermined file mode type.

8. The method of claim 7, further comprising the step of determining whether any other applications have already been loaded onto the IC card before the step of changing the operating mode.

9. The method of claim 7, further comprising loading said application onto the IC card if the file mode type of said application corresponds to the predetermined file mode type and no other applications have already been loaded onto the IC card.

10. The method of claim 8, wherein the changing step comprises changing the operating mode of said IC card if said file mode type corresponds to said predetermined file mode type and no other applications have already been loaded onto the IC card.

11. A method of routing a command by an operating system of an IC card, wherein said IC card includes a microprocessor, memory coupled to said microprocessor, and data stored in said memory representative of an operating mode associated with said IC card, said method comprising the steps of:

determining whether the operating mode of said IC card is a predetermined operating mode; and routing the command directly to an application if the operating mode of said IC card corresponds to the predetermined operating mode.

12. The method of claim 11, further comprising the steps of:

if the operating mode of said IC card does not correspond to the predetermined operating mode, determining whether said command is a select file command supported by said operating system; and routing said command to an operating system routine responsible for said select file command if said command is a select file command supported by said operating system.

13. The method of claim 11, wherein the IC card further comprises a currently selected file having an associated file type, the method further comprising the steps of:

if the operating mode of said IC card does not correspond to the predetermined operating mode, determining whether the file type of said currently selected file is supported by said operating system; and routing said command to an operating system routine responsible for said file type if the file type of said currently selected file is supported by said operating system.

14. The method of claim 13, if the file type of said currently selected file is not supported by said operating system, further comprising the step of routing said command to an application.

15. A method of delegating control between applications by an operating system of an IC card, wherein said IC card includes a microprocessor, memory coupled to said microprocessor a shell application stored in said memory for communicating with said operating system and for processing information formatted in a defined IC card format, and data stored in said memory representative of an operating mode associated with said IC card, said method comprising the steps of:

receiving a request by said operating system from a first application for delegating control to a second application;

determining whether the operating mode of said IC card is a predetermined operating mode;

determining whether said second application corresponds to said shell application; and failing the request for delegating control if the operating mode of said IC card corresponds to said predetermined operating mode and said second application corresponds to said shell application.

16. A method of initiating communication between an IC card and a terminal, wherein said IC card comprises a microprocessor and a memory, said memory having stored therein an operating system, a shell application, and data representative of an operating mode of said IC card, said operating mode representing whether selected information is to be routed to said operating system or said shell application, said method comprising the steps of:

receiving a reset signal by said IC card from said terminal; and returning an answer-to-reset from said IC card to said terminal based on said operating mode of said IC card.

17. The method of claim 16, wherein a plurality of answer-to-reset files are stored in said memory of said IC card, and said step of returning an answer-to-reset comprises selecting one of said answer-to-reset files based on said operating mode.

18. The method of claim 16, wherein said selected information is a command.

19. The method of claim 18, wherein said command is a file access command.

20. The method of claim 16, wherein said selected information is associated with a file structure format.

21. The integrated circuit card of claim 2, wherein said means is responsive only to said operating mode for routing said selected information to either said operating system or said shell application.

* * * * *